United States Patent
Luketic et al.

(10) Patent No.: US 8,212,179 B2
(45) Date of Patent: Jul. 3, 2012

(54) PARAMETRIC PRODUCTION OF DRILLED COOLING HOLES

(75) Inventors: Ivan Luketic, Untersiggenthal (CH); Ralf Walz, Heiligenzell (DE)

(73) Assignee: Alstom Technology Ltd, Baden (CH)

( * ) Notice: Subject to any disclaimer, the term of this patent is extended or adjusted under 35 U.S.C. 154(b) by 1177 days.

(21) Appl. No.: 11/346,271

(22) Filed: Feb. 3, 2006

(65) Prior Publication Data

US 2006/0229759 A1 Oct. 12, 2006

Related U.S. Application Data

(63) Continuation of application No. PCT/EP2004/051648, filed on Jul. 29, 2004.

(30) Foreign Application Priority Data

Aug. 4, 2003 (DE) .................... 103 35 657

(51) Int. Cl.
    *B23K 26/00* (2006.01)
(52) U.S. Cl. ............ 219/121.71; 219/121.7; 219/121.83
(58) Field of Classification Search ............ 219/121.71, 219/121.7, 121.83, 121.85, 121.6
    See application file for complete search history.

(56) References Cited

U.S. PATENT DOCUMENTS

| | | | |
|---|---|---|---|
| 4,197,443 A | | 4/1980 | Sidenstick |
| 5,140,264 A | * | 8/1992 | Metala et al. ................ 324/219 |
| 5,609,779 A | | 3/1997 | Crow et al. |
| 5,781,008 A | * | 7/1998 | Muller et al. ................ 324/230 |
| 5,796,619 A | * | 8/1998 | Wampler ...................... 700/195 |
| 5,815,400 A | | 9/1998 | Hirai et al. |
| 6,307,175 B1 | * | 10/2001 | Blochlinger et al. ..... 219/121.71 |
| 6,563,308 B2 | * | 5/2003 | Nagano et al. ................ 324/230 |
| 6,961,133 B2 | * | 11/2005 | Caton et al. .................... 356/630 |
| 2003/0052104 A1 | | 3/2003 | Matsumoto et al. |
| 2003/0103108 A1 | * | 6/2003 | Liu et al. ........................ 347/47 |
| 2003/0127438 A1 | | 7/2003 | Richter et al. |

FOREIGN PATENT DOCUMENTS

| | | |
|---|---|---|
| DE | 696 02 315 T2 | 11/1999 |
| EP | 0 365 195 A2 | 4/1990 |
| EP | 0 950 463 A1 | 10/1999 |
| EP | 1 286 020 A2 | 2/2003 |

OTHER PUBLICATIONS

PCT/ISA/210—International Search Report.
German Search Report.

* cited by examiner

*Primary Examiner* — M. Alexandra Elve
(74) *Attorney, Agent, or Firm* — Buchanan Ingersoll & Rooney PC

(57) ABSTRACT

The invention relates to a method for the parametric production of a drilled hole in a component, in particular for the parametric production of a drilled cooling hole in a blade of a gas or steam turbine. In the case of the method according to the invention, in a first method step (21) an actual wall thickness of the component is measured at the location at which the drilled hole is to be introduced. Subsequently, at least one parametric drilled-hole geometry value is determined on the basis of an adjustment of the measured, actual wall thickness with an assumed, ideal wall thickness (method step 23). The drilled hole is then produced according to the determined parametric drilled-hole geometry value (method step 24).
Furthermore, the invention relates to a drilling device, in particular for carrying out the method, and to a component into which one or more drilled holes have been introduced according to the method.

11 Claims, 3 Drawing Sheets

PARAMETRIC PRODUCTION OF DRILLED COOLING HOLES

RELATED APPLICATION

The present application claims priority under 35 USC §120 tO PCT/EP2004/051648, the entire contents of which are hereby incorporated by reference in their entirety.

BACKGROUND OF THE INVENTION

1. Field of Invention

The invention relates to a method for the parametric production of a drilled hole in a component, in particular for the parametric production of a drilled cooling hole in a component of a gas or steam turbine, preferably in a blade of a gas or steam turbine. Furthermore, the invention relates to a drilling device, in particular for carrying out the method, and to a component in which one or more drilled holes are introduced according to the method.

2. Description Of Related Art

To achieve high levels of efficiency with at the same time a high specific output, gas turbines are today operated with a very high turbine inlet temperature. The temperature of the hot fluid flow emerging from the combustion chamber and entering the turbine often exceeds the permissible material temperature of the turbine blading. To make it possible nevertheless for the gas turbine to be operated reliably and with a long lifetime, it is necessary to cool the blades of the turbine, and often also the blade roots and the housing wall. A very effective cooling method here is that of film cooling, in which it is attempted to cover the component that is to be cooled with a film of cooling fluid at the locations to be cooled and in this way shield them from the hot gas. To apply the film of cooling fluid, cooling fluid, for example cooling air, which has been diverted from a preceding compressor stage, is usually conducted by means of cooling ducts into the interior of the blade that is to be cooled, which is hollow on the inside, and from there via a multiplicity of drilled cooling holes to the outer side of the blade. The cooling fluid emerging from the drilled cooling holes is deflected and made to expand as it leaves the drilled cooling holes by the flow of hot gas flowing over the blade, in such a way that it forms a cooling film along the wall of the blade. The cooling film prevents hot gas from coming into contact directly with the blade.

SUMMARY

The formation of the film of cooling fluid is of central importance here for the effect of the cooling. If the cooling fluid flows out of the drilled cooling hole at too steep an angle, it enters too far into the flow of hot gas before it is deflected to the wall of the blade. As a consequence, vortexes form to an increased extent directly downstream of the drilled cooling hole, with the effect that the hot gas reaches the wall of the blade. The effectiveness of the cooling is diminished, in particular locally, and so-called hot spots of the blade may occur, i.e. local instances of overheating of the material of the blade. Hot spots can lead to the blade being damaged or even destroyed. However, hot spots may also occur if the emerging flow of cooling fluid is not made to expand adequately, to also sufficiently cover the intermediate region up to the cooling fluid that emerges from a neighboring drilled cooling hole. The same also applies if too little cooling fluid emerges from a drilled cooling hole.

The flow of the cooling fluid through a drilled cooling hole and the subsequent formation as a film of cooling fluid lying against the wall of the blade is determined considerably by the conduction of flow through the drilled cooling hole. If, for example, excessive flow losses of the cooling fluid occur here as a result of burrs of material created during production, too little cooling fluid flows through the drilled cooling hole. To make it possible for the cooling fluid to flow optimally as it emerges from the drilled cooling hole, the drilled cooling hole is often formed in the outlet region as a diffuser with a non-circular outlet cross section. If, however, the angle of the diffuser opening or the noncircular widening does not correspond here to the geometrical specifications, there may be an inappropriate outflow of the cooling fluid, with the consequences described above. Moreover, it is necessary to make a large number of drilled cooling holes of a blade match one another in such a way that a film of cooling fluid that is as closed as possible and envelops the blade is obtained.

A wide variety of methods are known in the state of the art for providing drilled cooling holes in turbine blades of a gas turbine, for example, or in other components. For example, such drilled holes may be produced by means of an electrodischarge machining method described in U.S. Pat. No. 4,197,443. Apart from the high production costs, such an electrodischarge machining method has the disadvantage that even small surface tolerances lead to greatly differing opening characteristics of the individual drilled holes. Another popular method for producing drilled cooling holes in components is that of laser drilling. A distinction is drawn here between percussion drilling, in which cylindrical drilled holes can be produced by a series of laser pulses, and trepanning drilling, in which a finely focused laser beam is moved in relation to the workpiece and the drilled hole is cut out in this way. This also allows drilled holes of noncircular cross sections to be produced.

To avoid in particular the drilled hole being impaired in the transitional regions from a circular cross section to a noncircular cross section while it is being produced, various methods have been developed. In U.S. Pat. No. 5,609,779, a laser beam is made to pass from the center line of the opening to the edge of the diffuser in an accelerated manner within just a few laser pulses. However, the diffusers produced by this method vary considerably.

A further method for producing a noncircular drilled cooling hole is described in the European laid-open specification EP 0 950 463 A1, the drilled cooling hole being made up in the direction of flow of a circular supply section and a noncircular diffuser section. To avoid impairment of the supply section during the drilling of the diffuser section, once the geometrical dimensions of the sections have been fixed there is first produced a through-drilled hole with a cross-sectional area within the cross-sectional area of the supply section and subsequently the diffuser section is cut out by a beam or jet drilling method in such a way that, in the region of the supply section, the drilling beam or jet remains essentially within the same cross-sectional area.

In all the methods known from the state of the art, the fixing of the respective drilling depth, for example for the supply section, is based on the design-dependent wall thickness of the location at which the drilled hole is to be provided. The geometrical dimensions are usually specified either in absolute dimensions or in relative dimensions with respect to the ideal design-dependent wall thickness and processed in a drilling control system for controlling the drilling tool. If, however, the actual wall thickness at this location deviates from the ideal wall thickness, deviations of the geometries of the actual drilled cooling hole from the ideal drilled cooling hole also occur and, as a consequence, in some cases considerable changes of the throughflow characteristics of the drilled cooling hole occur, even in the case of deviations of the wall thickness that are within the production tolerances. For example, the circular, cylindrical portion of the drilled hole may become too long, whereby the inlet region of the supply section is changed in comparison with the ideal inlet region, or the inlet region is then damaged. This causes a change in the throughflow of the cooling fluid in comparison with the intended throughflow. If, conversely, the supply section becomes too short, there is a reduction in the pressure losses of the flow of cooling fluid in the supply section, and consequently an increased and uncontrolled outflow of the cooling air from the drilled cooling hole concerned. If the diffuser is only incompletely produced, this directly influences the outflow behavior.

The invention is consequently based on the object of providing a method for the production of a drilled hole in a component, it being intended that the drilled hole produced by the method should correspond to predetermined, ideal throughflow characteristics even in the case of a deviation of the actual wall thickness from the ideal wall thickness. The method is intended in particular to be suitable for producing a drilled cooling hole in a component of a gas or steam turbine, preferably in a blade of a gas or steam turbine. Furthermore, it is an object of the invention to provide a drilling device for carrying out such a method.

The method according to the invention for the parametric production of a drilled hole in a component comprises the following method steps:
  a) measuring an actual wall thickness of the component at the location at which the drilled hole is to be introduced;
  b) determining at least one parametric drilled-hole geometry value on the basis of an adjustment of the measured, actual wall thickness with an assumed, ideal wall thickness;
  c) producing the drilled hole according to the at least one determined parametric drilled-hole geometry value.

The method according to the invention is suitable in particular for the parametric production of a drilled cooling hole in a component of a gas or steam turbine, preferably in a blade of a gas or steam turbine or else in the blade foot or housing.

As a difference from the method known from the state of the art, in the case of the method according to the invention, before the actual production of the drilled hole, the actual wall thickness of the component is measured at the location at which the drilled hole is to be introduced. This allows variations in the actual wall thickness which cannot be exactly predetermined, for example as a result of the material shrinkage during the casting operation, and vary from the ideal, design-dependent wall thickness in a tolerance range to be allowed for in the production of the drilled hole following the measuring process. One or more drilled-hole geometry values can in this way be adapted with allowance for the actual conditions before the actual production of the drilled hole in such a way that the drilled hole has precisely predetermined throughflow and/or outflow characteristics for a fluid flowing through the drilled hole. After the measuring of the actual wall thickness, the measured, actual wall thickness is adjusted with the specified, ideal wall thickness and at least one parametric drilled-hole geometry value is determined from the result of the adjustment. For this purpose, it is advantageous to determine the drilled-hole geometry value from the result of the adjustment with the aid of a simple functional relationship that is fixed in advance. The determined drilled-hole geometry value then serves as a parameter for the parametric production of the drilled hole and, for this purpose, is specified for example directly to a drilling tool control system, for example the control system of a laser.

The actual wall thickness of the component is expediently measured in method step a by means of an eddy current measurement. Component thickness measurements by means of an eddy current produce sufficiently accurate thickness results with comparatively little effort.

To determine the parametric drilled-hole geometry value, in method step b a difference value is preferably initially determined from the assumed, ideal wall thickness and the measured, actual wall thickness and the drilled-hole geometry value is subsequently determined on the basis of at least one specified value with allowance for the difference value. For example, the specified value may be changed in direct proportion to the determined difference value. For most applications, such a correlation is sufficient to achieve predetermined throughflow characteristics with sufficiently high accuracy. At the same time, the computational effort for determining the parametric drilled-hole geometry value is kept very low here. In an alternative calculation, however, it is also possible for a ratio of the actual wall thickness and the ideal wall thickness initially to be formed and the drilled-hole geometry value or the drilled-hole geometry values subsequently to be changed in proportion to the ratio determined.

The specified value may be an absolute value and changed in direct dependence on the difference value. Alternatively, however, the specified value may also be a relative value, with respect to the wall thickness, and changed by a value which is proportional to the difference value. In the latter case, the procedure is initially independent of the absolute wall thickness. Consequently, drilled-hole geometry values for walls of differing thickness can be calculated with one and the same determining algorithm. In both cases, the computational effort respectively for determining the drilled-hole geometry value is advantageously only small.

In the case of a drilled cooling hole that is to be produced, of a component of a gas or steam turbine, for example a blade of a gas or steam turbine, the drilled hole comprises in the direction of flow of the cooling fluid an inlet section, a feeding section and a diffuser section. The inlet section here is the region which adjoins a cooling fluid reservoir or a cooling fluid feeding line, which is arranged in the interior of the component or the blade. Turbine blades, for example, are usually hollow on the inside. The inlet section is consequently the region that directly adjoins the hollow space. Depending on the nature of the inlet section, a laminar or turbulent cooling fluid flow forms in the drilled cooling hole, which has a direct effect on the throughput through the drilled cooling hole. The feeding section adjoining the inlet section is usually cylindrically formed and connects the inlet section to the diffuser section. The feeding section and the inlet section are often also referred to as the supply section of the drilled cooling hole.

The diffuser section, adjoining the feeding section in the direction of flow of the cooling fluid, extends as far as the outer side of the blade. The cross section of the diffuser section is usually noncircular with a lateral widening, so that the stream of cooling fluid undergoes a surface-area expansion.

The length of the feeding section, predetermined as a specified value, is changed here, as the drilled-hole geometry value, by the difference value projected in the direction of the drilled hole. The projection allows here for the inclination of the drilled hole with respect to the direction of the thickness of the wall. This ensures that, even in the case of an actual wall thickness deviating from the ideal wall thickness, the diffuser section in particular, and expediently also the inlet section, are neither compressed nor extended during production in comparison with the ideal specified values. The deviation of the thickness of the actual wall from the ideal wall is completely allowed for by the adaptation of the length of the feeding section. The throughflow characteristics and the outflow characteristics of the drilled cooling hole consequently correspond to the ideal specified values with very good accuracy.

In addition or else alternatively, here the diameter of the cross section of the feeding section may also be changed as the drilled-hole geometry value in dependence on the difference value. This increases the accuracy to which the actual characteristics coincide with the specified characteristics.

In a particularly advantageous embodiment, the method is carried out fully automatically. For this purpose, the measured values and the values of the result of the adjustment as well as the determined drilled hole values are respectively transferred, advantageously fully automatically, from a measuring unit to a calculating unit and from there to a control unit for controlling a drilling tool. Full automation of the method makes it possible, for example, to produce turbine blades with in each case a multiplicity of drilled cooling holes arranged next to one another on the blade surface in a time-efficient and cost-efficient manner.

For this purpose, after running through the method steps a to c for producing a first drilled hole, the method is advantageously repeated one or more times to produce a further drilled hole or a number of further drilled holes in the component.

In a further aspect of the invention, a drilling device is provided, in particular for carrying out the method according to the invention described above for the parametric production of a drilled hole in a component. For this purpose, the drilling device according to the invention comprises a measuring unit for measuring a wall thickness of the component, a calculating unit for carrying out the adjustment of the measured, actual wall thickness with an assumed, ideal wall thickness and for determining at least one parametric drilled-hole geometry value on the basis of the adjustment, a control unit for controlling a drilling unit and also a drilling unit for introducing drilled holes in the component.

Particularly advantageously, the drilling unit comprises a laser drill. To produce drilled cooling holes, one of the beam drilling methods described in Patent Application EP 0 950 463 A1 may be advantageously used. A laser drilling method, preferably a pulsed laser drilling method, is suitable here in particular as the beam drilling method. For example, a pulsed Nd:YAG laser or a pulsed $CO_2$ laser is used here. However, the use of drilling jets, for instance a water jet, is also within the scope of the invention.

In particular to allow the drilling process to proceed fully automatically, the drilling device expediently additionally comprises a gripping and positioning unit, in order to grip the component that is to be machined and position it, preferably fully automatically, according to the machining step that is respectively to be carried out.

In a further aspect, the invention provides a component, in particular a blade of a gas or steam turbine, the component having at least one drilled hole, preferably a multiplicity of drilled holes, which have been produced according to the method described above. As a difference from the components known from the state of the art, in particular the turbine blades known from the state of the art, one or more drilled hole values of each drilled hole are respectively optimized in dependence on the respective wall thickness of the component at exactly the location of the drilled hole. For example in the case of drilled cooling holes, the lengths of the supply sections can be adapted to the local wall thicknesses in each case, so that the drilled holes consequently have desired throughflow and outflow characteristics without the previously customary range of variation caused by production-induced variations in geometry.

BRIEF DESCRIPTION OF THE DRAWINGS

The invention is explained in more detail below on the basis of exemplary embodiments in conjunction with the drawings, in which:

FIG. 2b shows a plan view of the drilled cooling hole from FIG. 2a;

Figure 1:
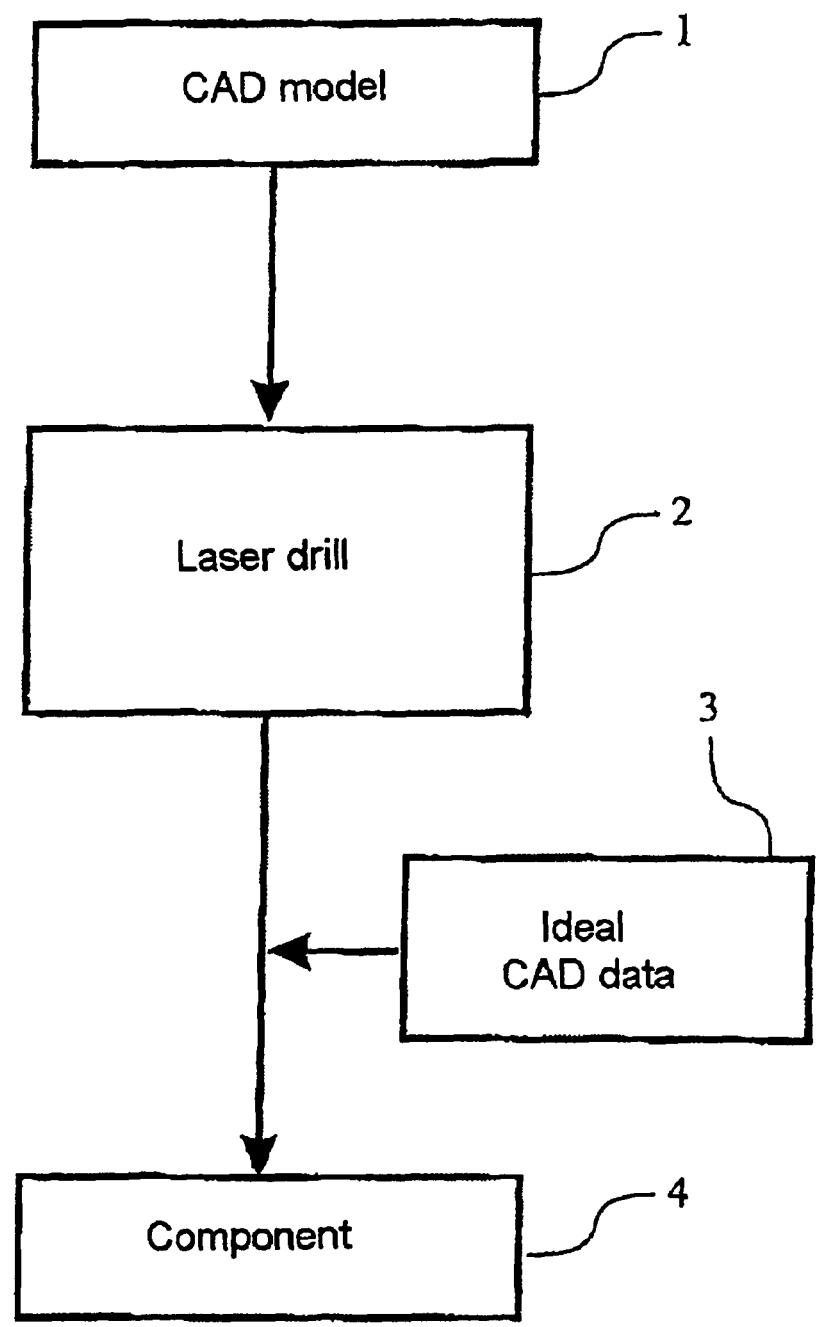
FIG. 1 shows a schematic representation in a flow diagram of a method known from the state of the art for the production of drilled holes.

In the figures, only the elements and components that are essential for understanding the invention are represented.

Components that are the same or have the same effect are largely provided with the same reference numerals.

DETAILED DESCRIPTION OF EMBODIMENTS

In FIG. 1, a flow diagram of a method known from the state of the art for the production of drilled holes is shown in a schematic representation. Starting from a CAD model 1, the drilled-hole geometry values 3 required for the production of the drilled hole are input or read into a control system of a drilling tool, for example a laser drill 2. Subsequently, on the basis of these drilled hole values, the drilled hole is produced in the component 4 with the drilling tool. Deviations of the actual dimensions of the component from the ideal dimensions, specified in the CAD model, are not additionally allowed for here. This can have the effect that the geometrical dimensions of the drilled hole actually produced deviate from the ideal drilled hole and, as a result, the throughflow and outflow characteristics of the drilled hole actually produced also deviate from the ideal drilled hole.

Figure 2A:
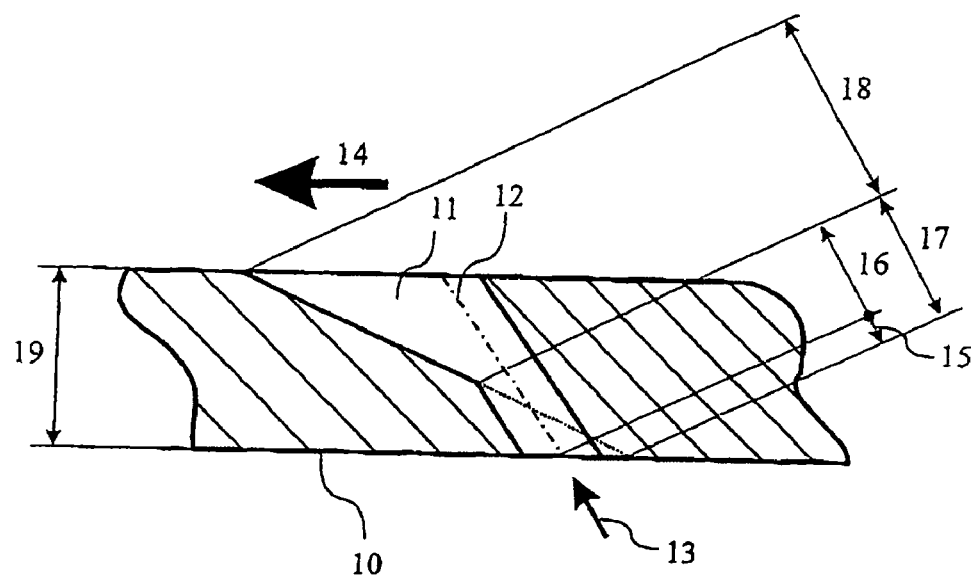
FIG. 2a shows a cross section through a wall of a turbine blade with a drilled cooling hole.
Figure 2B:
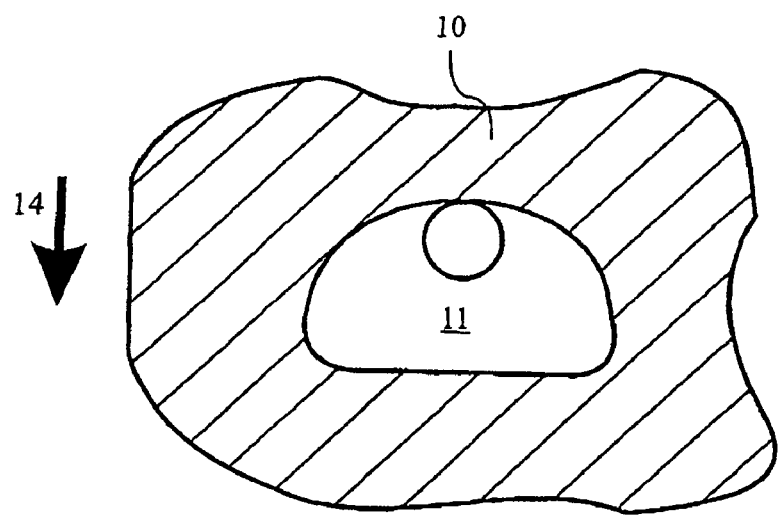

FIG. 2 shows a cross section through a wall 10 of a turbine blade with a drilled cooling hole 11 introduced into the wall. The turbine blade represented here is hollow on the inside. The hollow space in the turbine blade is used as a cooling fluid reservoir, which is fed with cooling air from one of the front compressor stages via feeding lines. During operation, the hot fluid flow coming from the combustion chamber flows on the outer side of the turbine blade according to the flow arrow 14.

The drilled cooling hole 11 is divided in the direction of flow 13 of a cooling fluid flow for the drilled cooling hole into an inlet section 15, a feeding section 16 adjoining the latter and a diffuser section 18 adjoining the feeding section. The inlet section 15 and the feeding section 16 may also, as represented here, be combined as a supply section 17 and have a constant cross section. The cross sections of the feeding section 16 and of the inlet section 18, in each case to be considered perpendicular to the center line 12 of the drilled hole, are circular in most applications, as also represented here, since circular drilled hole cross sections can be produced more easily from a production engineering viewpoint than noncircular drilled hole cross sections. Here, too, the radius of the drilled hole in the region of the feeding section 16 and the inlet section 15 remains constant, i.e. the entire supply section 17 of the drilled cooling hole 11 is cylindrically formed here. However, it may also be expedient to make the inlet region 15 have a noncircular cross section or else to give it a widening form or the form of a nozzle, in order to conduct the cooling air in the desired way from the adjacent reservoir into the drilled cooling hole 11. Here in FIG. 2, the diffuser section 18 has a noncircular cross section, widening toward the outlet, in order thereby to achieve the effect already in the drilled cooling hole 11 of making the cooling fluid jet conducted through the drilled hole expand and slow down. As a consequence, the cooling fluid jet leaving the drilled cooling hole, acting together with the mainstream flow, is on the one hand made to curve better toward the wall of the blade and on the other hand, as a result of the expansion, covers a wider region of the wall of the blade downstream of the drilled cooling hole. This leads overall to improved formation of a cooling film on the outer side of the turbine blade and consequently to better cooling than would be the case without a diffuser section.

The wall 10 represented in FIG. 2 has a nominal thickness 19, which corresponds to a value of a design-dependent and fluidically optimized CAD model. On the basis of this nominal thickness 19, the dimensions of the drilled cooling hole 11 were fixed in the design phase in such a way as to form a largely optimum cooling fluid stream through the drilled cooling hole and an optimum cooling film on the outer side of the blade when the cooling fluid leaves the drilled cooling hole, with allowance for all the required boundary parameters over a wide operating range of the gas turbine. If, however, the actual wall thickness of the turbine blade deviates from this predetermined wall thickness, for example as a result of production tolerances, the geometry of the drilled hole actually produced also deviates from the ideal drilled hole. This may then have the result, for example, that the supply section 16 becomes too long or too short in comparison with an ideal configuration or the diffuser 18 becomes too long or too short or else is configured with a changed opening angle of the diffuser. In all cases, this leads to a change in the flow conditions of the cooling fluid through the drilled cooling hole, with either a higher or lower mass throughput or poorer expansion of the cooling fluid jet when it leaves the drilled cooling hole. Since the drilled cooling hole was designed for optimum cooling effectiveness, any change in the actual or ideal geometry of the drilled cooling hole leads to a worsening of the cooling effectiveness.

Figure 3:
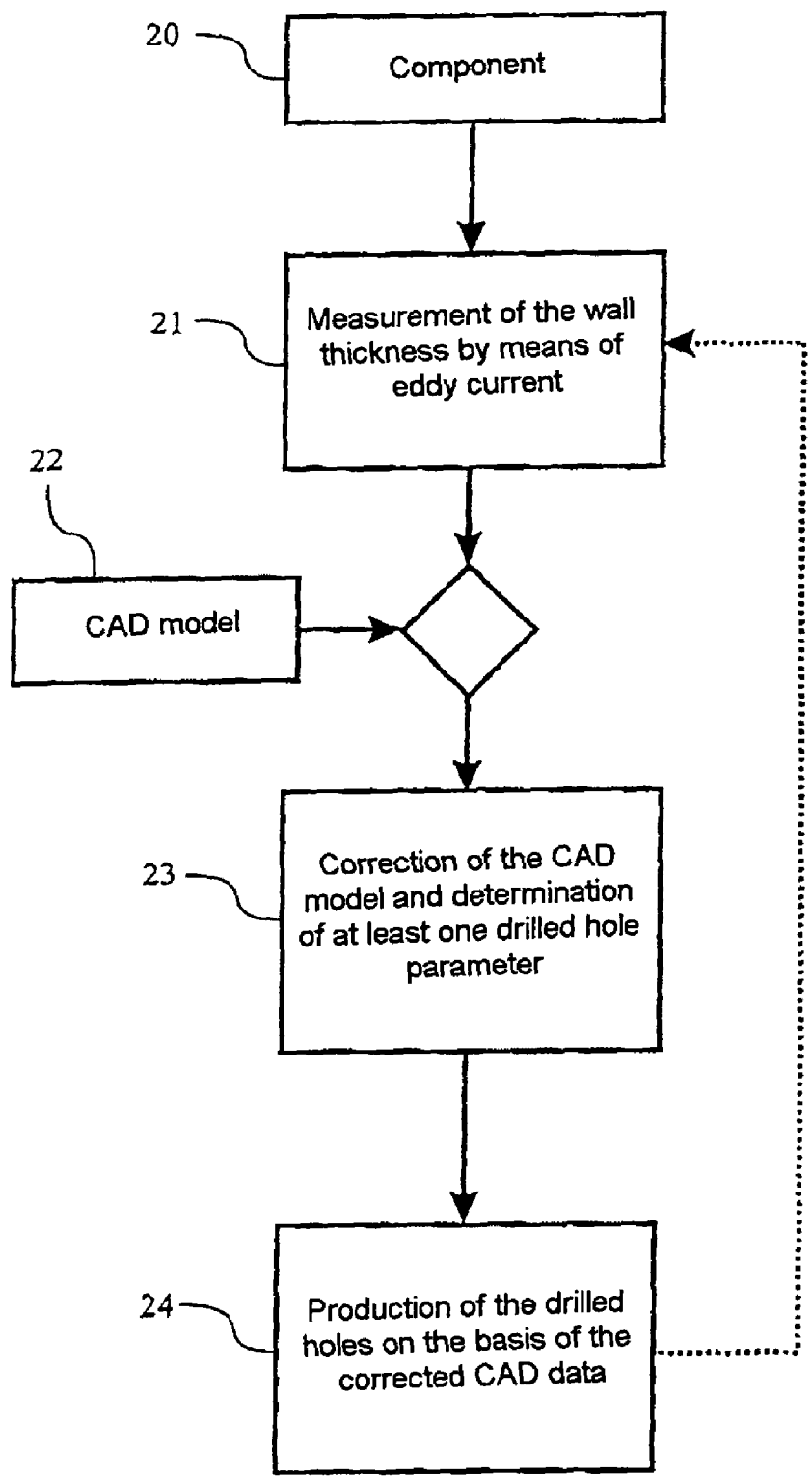
FIG. 3 shows in a schematic representation a flow diagram of the method according to the invention for the parametric production of drilled holes, in particular of drilled cooling holes.

To make allowance during the production of drilled holes for deviations of the wall thickness actually produced from wall thicknesses ideally specified, the invention, as it is depicted in the flow diagram schematically represented in FIG. 3, envisages in a first method step 21 measuring the actual wall thickness of the component 20 at the location at which the drilled hole is to be introduced. Starting from the measured value, an adjustment of the measured, actual wall thickness with the assumed, ideal wall thickness is performed in a further method step 23. The CAD data of the ideal component or the ideal drilled hole, which originate from the design and are specified here as input variables (see reference numeral 22), are consequently corrected here on the basis of the actually existing wall thickness. The result of the adjustment serves in method step 23 for the determination of at least one drilled-hole geometry value, which is then transferred to the control system of a suitable drill, for example a laser drill. In a further step 24, the drilled hole is then produced according to the drilled-hole geometry value determined as the drilled-hole parameter.

The method represented in FIG. 3 can also be used to produce a multiplicity of drilled holes in a component, the method steps 21 to 24 having to be executed for each drilled hole that is to be produced. In FIG. 3, such production of a multiplicity of drilled holes in a component is depicted by means of the dashed return line from method step 24 to method step 21.

In the present case, the measurement of the wall thickness 21 is performed for example by means of an eddy current measurement. To carry out method step 23, once the measurement has been performed, the result of the measurement is fed to a calculating unit, for example a CPU, to determine thereat least one drilled-hole geometry value to be allowed for for the drilled hole. For example, the length of the feeding section given here as a specified value may be changed, as the drilled-hole geometry value, by the difference value projected in the direction of the drilled hole. This means that, to compensate for the difference between the actual wall thickness and the ideal wall thickness, the feeding section is either made correspondingly longer or shorter. For this purpose, the projection of the difference value is performed in the direction of the center line of the drilled hole, in order to allow for the angle of inclination of the drilled hole. This ensures that the geometry of the diffuser section actually produced corresponds to the ideal, specified diffuser geometry, so that the predetermined and optimized flow conditions of the cooling fluid flowing through the drilled cooling hole are obtained here during operation.

To allow for the changing of flow losses in the feeding section on account of the deviation of the actual geometry from the ideal geometry, it may also be of advantage to change the diameter of the cross section of the feeding section and/or also the cross-sectional profile of the diffuser as one or more further drilled-hole geometry values in dependence on the difference value. If, for example, the feeding section is made longer, the cross section of the feeding section can also be increased, in order to compensate for additional flow losses, additionally occurring on account of the greater length of the feeding section. If, conversely, the feeding section is made shorter, it may be advantageous to reduce the cross section.

For this purpose, the drilled-hole geometry values can expediently be determined from the difference value by means of simple, specified correlations, preferably on the basis of proportional functions, and transferred to the control system of the drilling tool.

The invention claimed is:

1. A method for the parametric production of a drilled hole in a component, in particular for the parametric production of a drilled cooling hole in a component of a gas or steam turbine, preferably in a blade of a gas or steam turbine, the method comprising:
    a) providing data of an ideal component or an ideal drilled hole, which originate from a design of the component;
    b) specifying said data as input variables into a controlling system of a drilling tool;
    c) measuring an actual wall thickness of the component at the location at which the drilled hole is to be introduced;
    d) correcting said data based on the actual wall thickness;
    e) determining at least one parametric drilled-hole geometry value based on the corrected data;
    f) transferring said at least one parametric drilled-hole geometry value to the controlling system of the drilling tool; and
    g) producing the drilled hole according to the at least one determined parametric drilled-hole geometry value.

2. The method as claimed in claim 1, the actual wall thickness of the component being measured in method step a by means of an eddy current measurement.

3. The method as claimed in claim 1, the aim of determining the parametric drilled-hole geometry value being achieved in method step d by a difference value initially being determined from the assumed, ideal wall thickness and the measured, actual wall thickness and by the parametric drilled-hole geometry value subsequently being determined on the basis of at least one specified value with allowance for the difference value.

4. The method as claimed in claim 3, the specified value being an absolute value and the specified value being changed in dependence on the difference value.

5. The method as claimed in claim 3, the specified value being a relative value, with respect to the wall thickness, and the specified value being changed by a value which is proportional to the difference value.

6. The method as claimed in claim 3, the drilled hole being a drilled cooling hole of a component of a gas or steam turbine, in particular a blade of a gas or steam turbine, and the drilled hole comprising in the direction of flow an inlet section, a feeding section and a diffuser section and
the length of the feeding section, predetermined as a specified value, being changed, as the drilled-hole geometry value, by the difference value projected in the direction of the drilled hole and/or
the diameter of the cross section of the feeding section being changed in dependence on the difference value.

7. The method as claimed in claim 1, the method being carried out fully automatically.

8. The method as claimed in claim 1, after carrying out the method steps a to g for producing a first drilled hole, the method being repeated to produce a further drilled hole or a number of further drilled holes in the component.

9. A drilling device, in particular for carrying out the method for the parametric production of a drilled hole in a component according to claim 1, comprising:
a measuring unit for measuring an actual wall thickness of the component;
a calculating unit for carrying out an adjustment of the measured, actual wall thickness with an assumed, ideal wall thickness and for determining at least one parametric drilled-hole geometry value on the basis of the adjustment;
a control unit for controlling a drilling unit and
a drilling unit for introducing drilled holes into the component.

10. The drilling device as claimed in claim 9, the drilling unit comprising a laser drill.

11. The drilling device as claimed in claim 9, the drilling device additionally comprising a gripping and positioning unit, in order to grip the component that is to be machined and position it, preferably fully automatically, according to the machining step that is respectively to be carried out.

* * * * *